United States Patent
Russell et al.

(10) Patent No.: US 6,500,512 B2
(45) Date of Patent: Dec. 31, 2002

(54) APPARATUS AND METHOD FOR USE IN THE MANUFACTURE OF MULTIPLE LAYER OPTICAL DISCS

(75) Inventors: Robert Lowell Russell, Cloverdale, IN (US); Barry Fite, Terre Haute, IN (US)

(73) Assignees: Sony Corporation, Tokyo (JP); Digital Audio Disc Corporation, Terre Haute, IN (US)

( * ) Notice: Subject to any disclaimer, the term of this patent is extended or adjusted under 35 U.S.C. 154(b) by 0 days.

(21) Appl. No.: 09/777,938

(22) Filed: Feb. 6, 2001

(65) Prior Publication Data

US 2002/0106474 A1 Aug. 8, 2002

(51) Int. Cl.⁷ .................................................. B32B 3/02
(52) U.S. Cl. ..................................... 428/64.1; 428/64.4
(58) Field of Search .............................. 428/64.1, 64.4, 428/913; 430/270.11, 495.1, 945

(56) References Cited

U.S. PATENT DOCUMENTS

| | | | |
|---|---|---|---|
| 5,756,265 A | 5/1998 | Abe et al. | |
| 5,827,593 A * | 10/1998 | Maruyama | 428/64.1 |
| 5,904,969 A * | 5/1999 | Kamezaki | 428/64.1 |
| 5,939,162 A * | 8/1999 | Asai | 428/64.1 |
| 6,083,598 A * | 7/2000 | Ohkubo | 428/64.1 |
| 6,117,284 A | 9/2000 | Mueller | |
| 6,214,432 B1 * | 4/2001 | Chullino | 428/64.1 |

* cited by examiner

*Primary Examiner*—Elizabeth Mulvaney
(74) *Attorney, Agent, or Firm*—Wood, Herron & Evans, L.L.P.

(57) ABSTRACT

An improved optical disc for use in the manufacture of a multilayer optical disc. The improved optical disc has a first side with a data layer and at least one projection extending outward from the first side. The projection separates the first side of the improved optical disc from another optical disc used in the manufacture of the multilayer optical disc, thereby providing a uniform adhesive layer between the discs. A mutilayer optical disc and a method of making a multilayer optical disc utilizing the improved optical disc is also described.

33 Claims, 3 Drawing Sheets

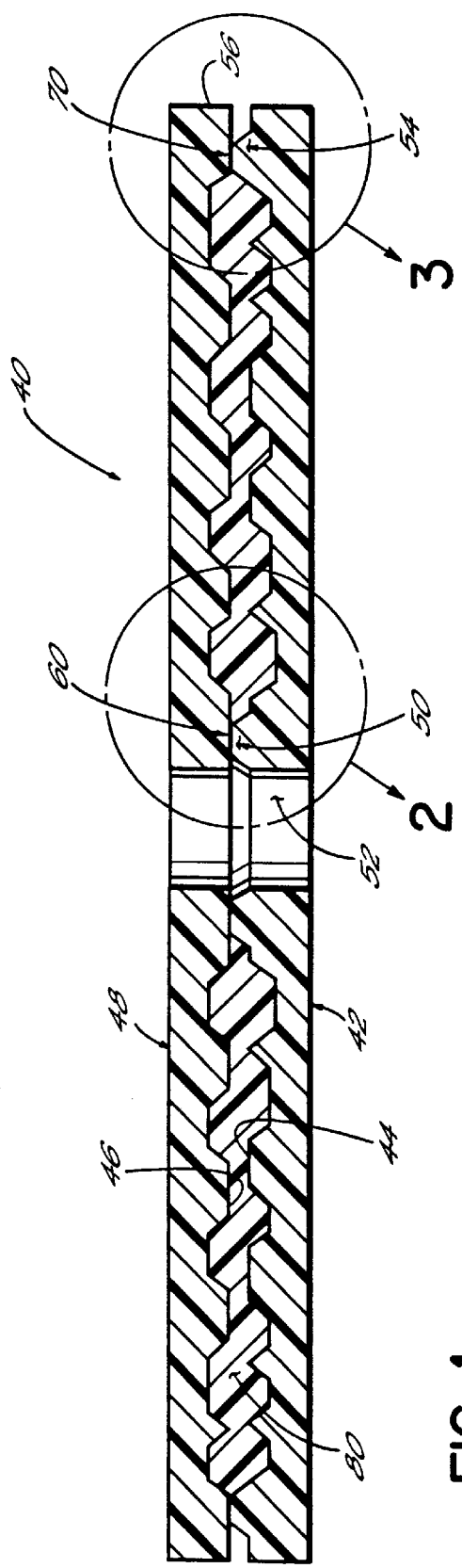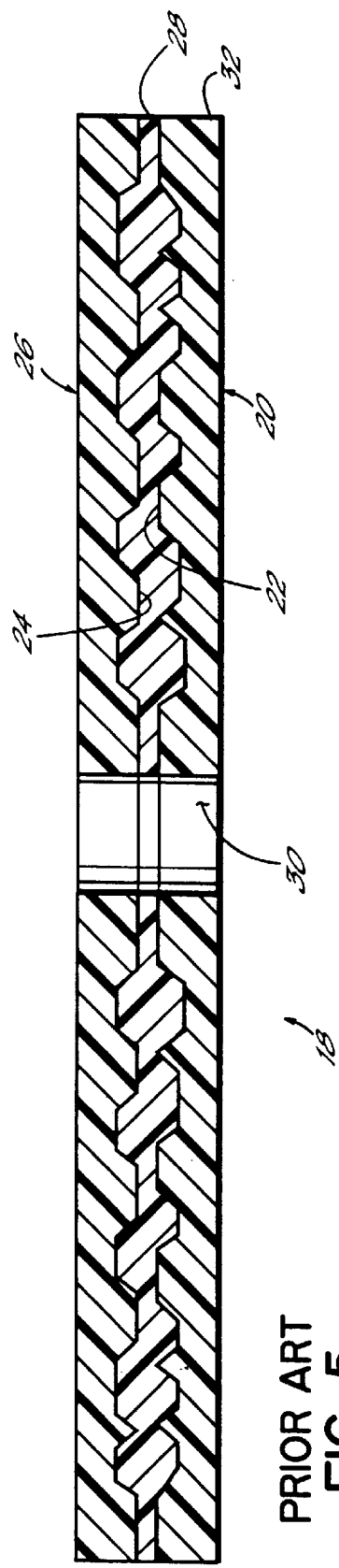
FIG. 1
PRIOR ART
FIG. 5

APPARATUS AND METHOD FOR USE IN THE MANUFACTURE OF MULTIPLE LAYER OPTICAL DISCS

FIELD OF THE INVENTION

This invention relates generally to optical disc manufacturing and more particularly, to the manufacture of multilayer optical discs.

BACKGROUND OF THE INVENTION

Multilayer discs are now being produced that are an assembly of two discs, each with its own data layer of grooves or pits representing recorded and stored data or information. Referring to FIG. 5, a composite disc 18 is formed of a first, bottom disc 20 normally having a first, lower, sputtered semi-reflective data layer or surface 22. A read laser either focuses on the first surface 22 or, alternatively, penetrates through the first surface 22 and focuses on a second, data layer or surface 24 on a second, top disc 26. The distance between the two surfaces or focal planes 22, 24 is made up of a transparent bonding layer 28 joining the two discs 20, 26 together. Industry DVD specifications require that the transparent bonding layer be in the range of from 40 microns to 70 microns. Other specifications may be required to comply with other specific formats.

The composite disc 18 is formed from two discs that are normally manufactured using an injection molding process. An ultraviolet, curable, liquid resin, for example, lacquer, that functions as an adhesive is first deposited on a lower rotating disc 20. Upon striking the rotating disc surface 22, the resin spreads across the disc surface 22 toward the inner centerhole 30 and the outer disc circumference 32. However, the resin that first contacts the disc surface 22 will have experienced substantial spreading as the last of the resin is deposited on the surface 22 of the disc 20. Thus, before the final resin deposited spreads, the first resin deposited may reach and spill over the inner hole 30 and/or the outer circumference 32 of the disc 20. Any resin that does spill off of the disc 20 must somehow be handled and contained which adds cost to the process in terms of machine design, maintenance and the cost of the resin.

The construction of the composite disc 18 continues by placing the other disc 26 on top of the resin coating on the upper surface 22 of the first disc 20, thereby forming the multilayer disc 18. The multilayer disc assembly 18 with the uncured resin layer therebetween is subjected to a high speed spinning process to achieve a desired thickness of the intermediate laquer layer. After the spinning process, the resin is cured; and the multilayer disc construction process is complete.

The above spinning process presents several challenges with respect to consistently manufacturing a high quality multilayer disc. First, the spinning process has no process feedback and thus, is not subject to precise control from one disc to another. Further, the forces created by the spinning create a nonuniform resin thickness profile across the resin layer. The resin thickness profile changes from a thinner layer close to the centerhole 30 of the multilayer disc 18 to a thicker layer near its outer circumference 32. The nonuniform resin layer between the discs 20, 26 does not permit a true noise-free replay of the disc.

To hold the thickness of the resin layer within specifications, the resin layer of a finished multilayer disc is measured at many different locations. Those measurements are statistically processed, and the spinning process is adjusted over a period of time, as required, to maintain the resin layer within desired thickness specifications. Many manufacturing environments strive for a thickness specification that is more strict than the about 40–70 microns thickness required by the industry specification. And, the known manufacturing processes can lead to the production of out-of-specification discs while the spinning process is being tuned to hold the resin layer thickness within specification.

Thus, the current multilayer disc bonding process presents several opportunities for improvement. First, there is no real-time control of the thickness of the resin bonding layer between the discs. Second, since the resin is continuously deposited over a single rotation, the first resin deposited reaches the inner hole and the outer edge sooner than the later deposited resin. Third, control over the thickness of the resin layer is further complicated because both of the discs are flat; and therefore, the resin flows freely in all directions and may flow into the inner hole and/or over the outer edge of the disc.

Consequently, there is a need for an improved process for joining two optical discs to form a multilayer disc with an intermediate bonding fluid layer that has a more predictable thickness profile.

SUMMARY OF THE INVENTION

The present invention provides an improved optical disc for use in a multilayer disc that provides a consistently high quality noise-free playback of data on the disc. Further, in the manufacture of a multilayer optical disc, the improved optical disc of the present invention can be adhered to another optical disc with a bonding layer thickness that is reliably and repeatably maintained within specification. Therefore, multilayer optical discs are manufactured with a minimum of scrap and thus, manufacturing costs are reduced. Further, the repeatably consistent bonding layer thickness provided by the present invention has the advantage of being able to consistently read data through the bonding layer.

According to the principles of the present invention and in accordance with the described embodiment, the invention provides an optical disc for use in the manufacture of a multilayer optical disc. The optical disc has a first side with a data layer and at least one projection extending outward from the first side. The projection separates the first side from another optical disc used in the manufacture of the multilayer optical disc. The projection is effective to maintain a known and constant bonding layer separation between this optical disc and another optical disc bonded thereto in the manufacture of the multilayer optical disc. Maintaining a repeatably consistent bonding layer improves the consistency of the reading of data from the disc.

In one aspect of the invention, the projection is comprised of a first projection located between a center hole and the data layer and a second projection located between the data layer and an outer circumferential edge of the optical disc. In another aspect of the invention, the first and second projections extend outward from the first side a distance of about 40–70 microns. The use of two projections radially separated on the first side of the optical disc provides a better control over the consistency of the thickness of the bonding layer. In addition, the inner projection substantially stops the migration of air from the centerhole into the bonding layer during a spinning process. Thus, the present invention provides a more consistent and pure bonding layer thickness across the whole diameter of the resulting multilayer optical disc. Such consistency further improves the noise-free readability of data from the optical disc.

In another embodiment, the present invention provides a multilayer optical disc having a first optical disc with a first side and a second optical disc with a first side facing the first side of the first optical disc. An adhesive extends between the first sides of the first and second optical discs, thereby bonding the first and second optical discs together to form the multilayer optical disc. A spacing bridge is located between, and contacts, the first sides of the first and second optical discs. The spacing apparatus separates the first and second optical discs by a distance that is substantially equal to a desired thickness of the adhesive. Again, the multilayer optical disc has a more consistent bonding layer thickness across its whole diameter which further improves the noise-free readability of data from the multilayer optical disc.

In another embodiment, the present invention provides a method of making a multilayer optical disc by first, applying a bonding agent to a first side of a first optical disc during substantially a single rotation of the first optical disc. Next, a first side of a second optical disc is placed on top of the first side of the first optical disc; and the first side of the second optical disc is supported on a spacing bridge extending between the first and second optical discs. The first and second optical discs are spun to spread the adhesive to a uniform, desired thickness therebetween.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 1 is a diagrammatic diametric cross-sectional view of a multilayer, composite disc with spacing bridges in accordance with the principles of the present invention.

FIG. 5 is a diametric cross-sectional view of a known multilayer, composite disc.

DETAILED DESCRIPTION OF THE INVENTION

Figure 2:
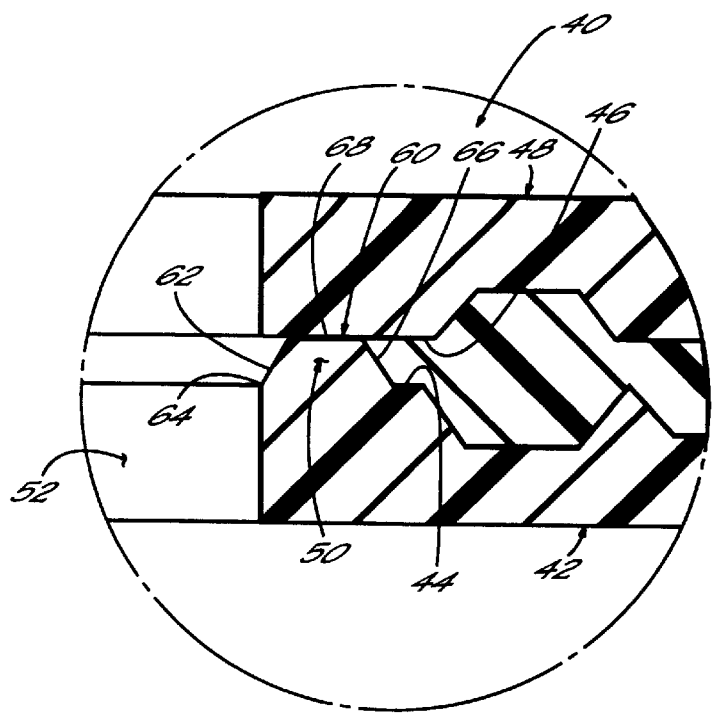
FIG. 2 is an enlarged view of the inner bridge illustrated in FIG. 1.

Referring to FIG. 1, a composite disc 40 in accordance with the present invention is formed of a first, bottom disc 42 and a second, top disc 48. The bottom disc 42 has a first, lower, sputtered semi-reflective data layer on a focal plane or surface 44. The top disc 48 has a second, upper, fully reflective data layer on a focal plane or surface 46. As discussed earlier, the distance between the two focal planes or surfaces 44, 46 is specified by DVD industry specifications to be in the range of about 40–70 microns.

As shown in FIG. 1, the distance between the discs 42, 48 is fixed by spacing bridges 50, 54. The annular, inner spacing bridge 50 is formed on the lower disc 42 and surrounds a centerhole 52; and the outer spacing bridge 54 is formed on the lower disc 42 adjacent an outer circumference 56. The spacing bridges 50, 54 extend outward from surface 44 a distance or height of about 40–70 microns; and typically, the spacing bridges 50, 54 are about 55 microns in height.

Referring to FIG. 2, the inner spacing bridge 50 is located immediately adjacent the centerhole 52 of the lower disc 42. The centerhole 52 has a radius of about 7.5 mm, and the data layer on surface 44 normally begins at a radius of about 23 mm. The bridge 50 is a continuous annular boss or projection 60 extending above the surface 44 that is located at a radius between about 10 mm and about 23 mm. In cross-sectional profile, the projection has a first, angled or sloping side wall 62 that begins at a radius of about 10 mm from the centerhole 52. The first side wall 60 slopes radially outward at an angle of about 45°. The projection 60 has a second, opposed, angled or sloping side wall 66 that slopes radially inward at an angle of about 45°. Thus, the side walls 62, 66 slope toward each other and intersect a top, supporting surface 68. The cross-sectional profile of the projection 60 is principally determined by the manufacturing process used to form the projections 60 on the disc 42. For example, the angle of the side walls 62, 66 is chosen to facilitate a release of the side walls 62, 66 from a mold. The radial width of the inner bridge 50 is normally chosen to be as small as possible, that is, the smallest width that can be reliably and repeatably molded. For example, the radial width of the inner bridge 50 is about 2 mm but may be thicker or thinner. The radial width of the inner bridge is normally a width that can be repeatably molded with sufficient accuracy. Thus, the projections 60 of the inner bridge 50 can have any shape as long as the inner bridge 50 separates the discs 42, 48 by a distance or spacing determined by industry specifications, for example, about 40–70 microns.

Figure 3:
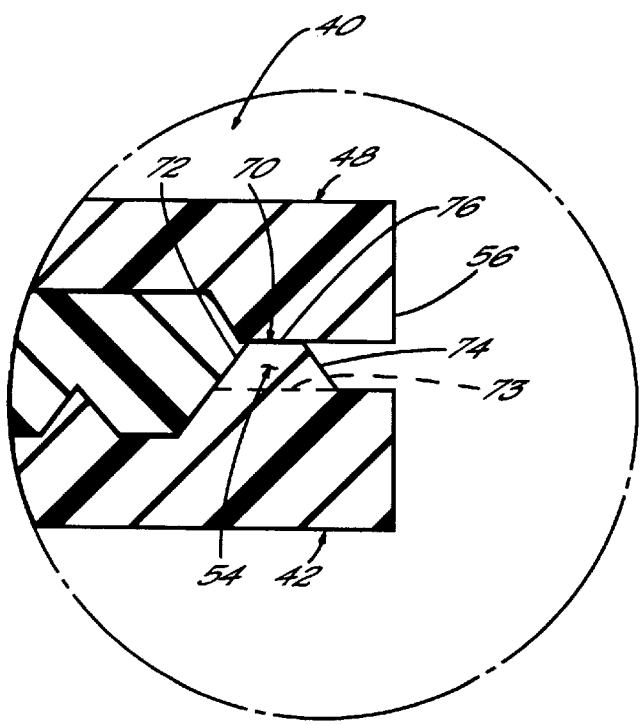
FIG. 3 is an enlarged view of the outer bridge illustrated in FIG. 1.
Figure 4:
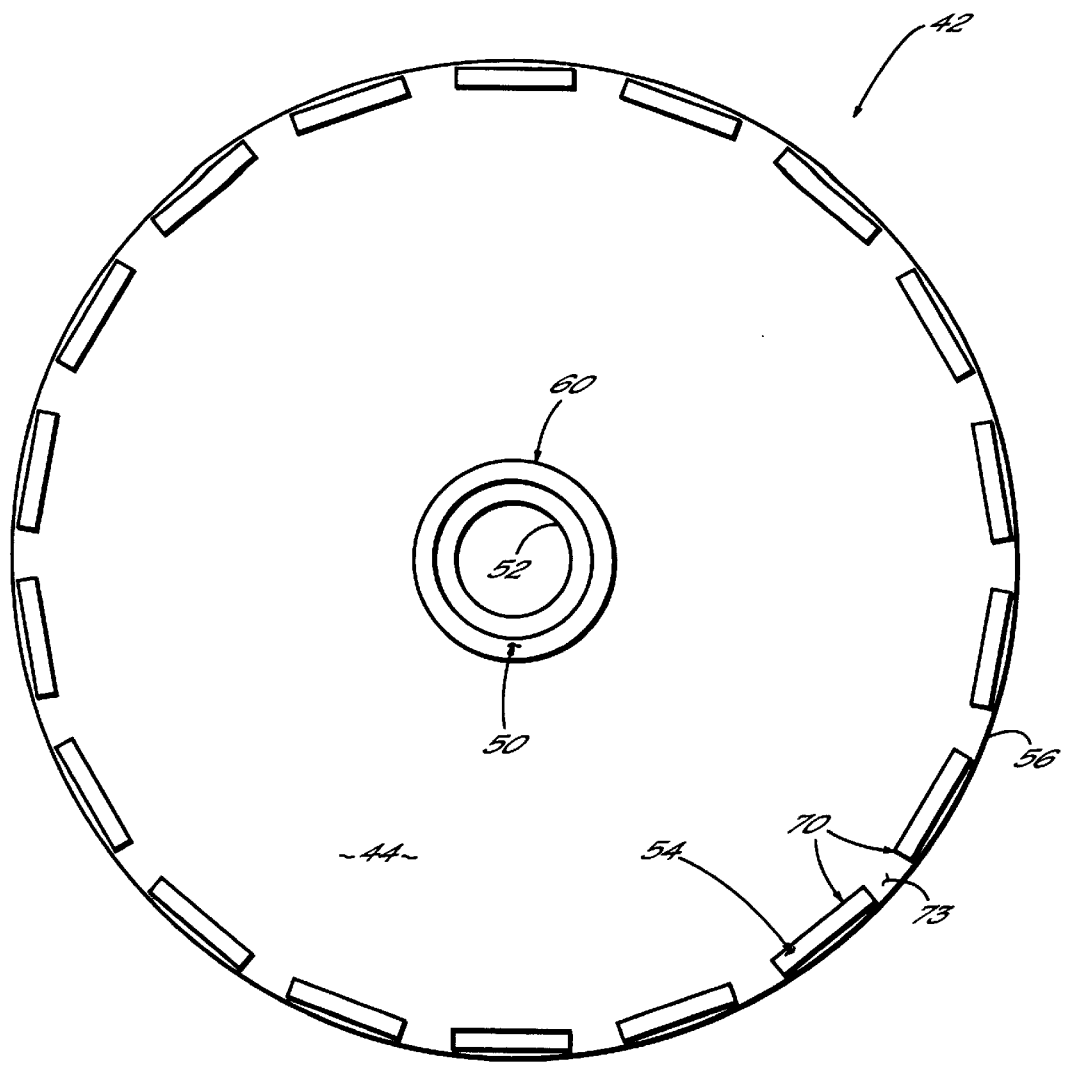
FIG. 4 is a top plan view of a disc of the composite disc of FIG. 1 employing spacing bridges in accordance with the principles of the present invention.

Referring to FIGS. 3 and 4, the outer spacing bridge 54 is located immediately inside the outer edge 56 of the disc 42. The outer edge 56 is normally located at a radius of about 60 mm, and the data layer on surface 44 normally extends to a radius of about 58 mm. The bridge 54 is comprised of a series of bosses or projections 70 extending above the surface 44. In cross-sectional profile, each projection 70 has first and second angled side walls 72, 74 that intersect an upper supporting surface 76. Like the inner bridge 50, the cross-sectional profile of the projections 70 is principally determined by the manufacturing process used to form the projections 70 from the disc 42. The angle of the side walls 72, 74 and the radial thickness of the outer bridge 54 are chosen in a manner similar to that previously described with respect to the inner bridge 50. Thus, the projections 70 of the outer bridge 54 can have any shape that can be repeatably molded with reasonable accuracy and that separates the discs 42, 48 by a distance or spacing determined by industry specifications, for example, about 40–70 microns.

The discs 42, 48 are normally made with a molding process, for example, an injection molding process. The data layers on surfaces 44, 46 are created by a stamping plate mounted on one of the molds in a known manner. The stamping plate surface must be hard and durable so that it may be used over a large number of molding cycles; and therefore, the molding surface on the stamping plate is often made of a nickel material. The outwardly extending spacing bridges 50, 54 on the disc 42 translate into matching indentations or dimples in the nickel molding surface of the stamping plate. Therefore, a die having projections or protuberances matching the desired bridges 50, 54 can be used in a press to form mating depressions in the nickel molding surface of the stamping plate. Thus, in addition to forming the data layers 44, 46, the stamping plate is also used to form bridges 50, 54 in the injection molded polycarbonate used to make the disc 42.

In use, in the process of making the composite disc 40, the lower disc 42 is supported and rotated as a liquid adhesive is deposited on the disc in a known manner. As the lower disc 42 rotates, the adhesive spreads toward the centerhole 52 and the inner spacing bridge 50 as well as the outer edge 56 and the outer spacing bridge 54. The resin is normally dispensed during a full, or slightly less than full, revolution of the lower disc 42. Therefore, the adhesive spreads across the disc 42 at different times. Adhesive that is dispensed first will be the first to contact the inner wall or spacing bridge 50. The continuous annular nature of the spacing bridge 50 prevents adhesive from flowing into the centerhole 52. The inner bridge 50 is also effective to avoid the migration of air from the centerhole 52 which is encouraged by the spinning process.

As the disc 42 rotates, the adhesive is also forced radially outward toward the outer spacing bridge 54. The presence of the outer spacing bridge 54 helps retain the adhesive initially dispensed onto the disc 42 from flowing over the outer edge 56 while the remainder of the adhesive is being dispensed. However, as shown in FIG. 4, the projections 70 comprising the spacing bridge 54 has spaces 73 intermediate the projections 70. The spaces 73 permit excess adhesive to spill over the outer edge 56 during the adhesive application process.

After the adhesive is applied, the upper disc 48 is carefully placed over the lower disc 42. The upper surface 66 of the inner spacing bridge 50 contacts the surface 46 of the upper disc 48. Similarly, the upper surface 76 of the outer bridge 54 also contacts the surface 46 adjacent the outer edge 56. The discs 42, 48 are then spun to more evenly spread the adhesive therebetween. The bridges 50, 54 function to fix the spacing between the surfaces 44,46 on the respective discs 42, 48; and during the spinning process, the adhesive spreads more evenly between the surfaces 44, 46. Since the spacing bridges 50, 54 extend about 55 microns above the surface 44, the distance between the surfaces 44, 46 and thus, the thickness of the intermediate adhesive layer 80, is maintained at about 55 microns. Therefore, the thickness of the adhesive layer is substantially in the middle of the specified range of about 40–70 microns.

The above-described optical disc for use in a multilayer disc provides a consistently high quality noise-free playback of data on the disc. Further, in the manufacture of a multilayer optical disc, the above-described optical disc is adhered to another optical disc with a bonding layer thickness that is reliably and repeatable maintained within specification. Therefore, multilayer optical discs are manufactured with a minimum of scrap and thus, manufacturing costs are reduced. Further, the repeatably consistent bonding layer thickness provided by the present invention has the advantage of being able to consistently read data through the bonding layer.

With the above-described embodiment, the use of two projections radially separated on the first side of the optical disc provides a better control over the consistency of the thickness of the bonding layer. In addition, the inner projection substantially stops the migration of air from the centerhole into the bonding layer during a spinning process. Thus, the use of projections provides a more consistent and pure bonding layer thickness across the whole diameter of the resulting multilayer optical disc. Such consistency further improves the noise-free readability of data from the optical disc.

While the invention has been illustrated by the description of one embodiment, and while the embodiment has been described in considerable detail, there is no intention to restrict nor in any way limit the scope of the appended claims to such detail. Additional advantages and modifications will readily appear to those who are skilled in the art. For example, with the embodiment illustrated in FIG. 1, two spacing bridges 50, 54 are used; however, as will be appreciated, either one of the spacing bridges 50, 54 can be used alone. Further, a single spacing bridge can be placed at any radial location that is consistent with industry specifications for the disc 40.

Further, in the described embodiment, the inner bridge 50 is illustrated as a continuous annular projection extending around a circumference adjacent the centerhole 52. However, as will be appreciated, the inner bridge 50 may be a segmented or discontinuous annular ring or any number of annularly disposed bumps, ridges or other protuberances that function to separate the discs 42, 48 by the desired spacing, that is, about 40–70 microns.

Further, the outer bridge 54 is illustrated as a series of spaced apart projections 70 extending circumferentially adjacent the outer edge 56. However, as will be appreciated, the outer bridge 54 can be formed by any number of circumferentially disposed bumps, ridges or other protuberances that function to separate the discs 42, 48 by the desired spacing, that is, about 40–70 microns.

In the description of FIGS. 1–4, the bridges 50, 54 are both disposed on the lower disc 42 so that, during the adhesive dispensing process, adhesive is restrained from flowing over the edge 64 of the inner hole 52 and/or the outer edge 56. However, in alternative embodiments of the invention, it is contemplated that the spacing bridges 50, 54 can be located on the upper plate 48. As a further alternative, one spacing bridge, for example, spacing bridge 50, can be located on one disc, for example, upper disc 48, and the other spacing bridge, for example, spacing bridge 54, can be located on the lower disc 42 and vice versa.

In a still further embodiment, spacing bridges 50, 54 may be located on both the lower disc 42 and the upper disc 48. In one example, the inner bridge 50 may be formed by first arcuate segments on the lower disc 42 and second arcuate segments on the upper disc 48. The segments being spaced such that when the disc 48 is placed over the lower disc 42, the segments on the upper disc 48 are disposed between the arcuate segments on the lower disc 42. A similar construction may be used to form the outer bridge 54. In another embodiment, the inner bridge 50 may be formed by a single or multiple arcuate segment on the lower disc and one or more opposing arcuate segments on the upper disc 48. Therefore, when the upper disc is placed on the lower disc 42, the opposing segments contact each other to form the inner bridge 50. A similar construction may also be utilized to form the outer bridge 54.

In a further embodiment, the inner bridge may be formed by causing the surface 44 to have randomly arranged protuberances such that the bridge 50 merely appears as a texture portion of the surface 44. Again, such textured areas may be on one or the other of the discs 42, 48 or on areas of both of the discs 42, 48.

Therefore, the invention in its broadest aspects is not limited to the specific details shown and described. Consequently, departures may be made from the details described herein without departing from the spirit and scope of the claims which follow.

What is claimed is:

1. An optical disc for use in the manufacture of a multilayer optical disc comprising:
   a first side having a data layer and at least one projection extending outward from the first side of the optical disc and having a thickness of about 2 mm., the projection adapted to separate the first side from another optical disc used in the manufacture of the multilayer optical disc.

2. The optical disc of claim 1 further comprising a centerhole and the projection is located near the centerhole.

3. The optical disc of claim 2 wherein the projection comprises an annular ring surrounding the centerhole.

4. The optical disc of claim 1 further comprising an outer circumferential edge and the projection is located near the outer circumferential edge.

5. The optical disc of claim 4 wherein the projection comprises a plurality of individual projections.

6. The optical disc of claim 5 wherein the plurality of individual projections are positioned to have a plurality of spaces therebetween.

7. The optical disc of claim 1 wherein the projection extends outward from the first side a distance of about 40–70 microns.

8. The optical disc of claim 1 wherein the projection extends outward from the first side about 55 microns.

9. An optical disc for use in the manufacture of a multilayer optical disc comprising:
   a first side;
   centerhole;
   an outer circumferential edge;
   an annular ring around the centerhole; and
   a plurality of individual projections located adjacent the outer circumferential edge, the annular ring and the plurality of individual projections adapted to separate the first side from another optical disc used in the manufacture of the multilayer optical disc.

10. The optical disc of claim 9 wherein the first and second projections extend outward from the first side a substantially equal distance.

11. The optical disc of claim 10 wherein the first and second projections extend outward from the first side, about 40–70 microns.

12. The optical disc of claim 11 wherein the first and second projections extend outward from the first side about 55 microns.

13. An optical disc for use in the manufacture of a multilayer optical disc comprising:
   a first side extending from a center hole to an outer circumferential edge, the first side comprising
     a data layer,
     a first projection located between the center hole and the data layer, the first projection extending outward from the first side a desired distance, and
     a second projection located between the data layer and the outer circumferential edge, the second projection extending outward from the first side a distance substantially equal to the desired distance.

14. The optical disc of claim 13 wherein the second projection comprises a plurality of individual projections.

15. The optical disc of claim 14, wherein the plurality of individual projections are positioned to have a plurality of spaces therebetween.

16. The optical disc of claim 15, wherein the first and second projections extend outward from the first side a distance of about 40–70 microns.

17. The optical disc of claim 16 wherein the first and second projections extend outward from the first side a distance of about 55 microns.

18. A multilayer optical disc comprising:
   a first optical disc having a first side;
   a second optical disc having a first side facing the first side of the first optical disc;
   an adhesive extending between the first sides of the first and second optical discs for bonding the first and second optical discs together to form the multilayer optical disc;
   a first spacing bridge located on the first side of the first optical disc and having a height substantially equal to about one-half of a distance being substantially equal to a desired thickness of the adhesive; and
   a second spacing bridge located on the first side of the second optical disc and having a height substantially equal to about one-half of the distance, the first and second spacing bridges contacting each other to separate the first and second optical discs by the distance.

19. The multilayer optical disc of claim 18 wherein the spacing bridge comprises a first projection extending outward from the first side of the first optical disc through a height substantially equal to the desired thickness of the adhesive.

20. The multilayer optical disc of claim 19 wherein the first optical disc further comprises a centerhole and the first projection is located adjacent the centerhole.

21. The multilayer optical disc of claim 20 wherein the first projection comprises an annular ring.

22. The multilayer optical disc of claim 20 wherein the first optical disc further comprises an outer circumferential edge and the spacing bridge further comprises a second projection located adjacent the outer circumferential edge.

23. The multilayer optical disc of claim 22 wherein the second projection comprises a plurality of individual projections.

24. The multilayer optical disc of claim 22 wherein the first and second projections extend outward from the first side of the first disc a distance of about 40–70 microns.

25. The multilayer optical disc of claim 24 wherein the first and second projections extend outward from the first side of the first disc a distance of about 55 microns.

26. The multilayer optical disc of claim 18 further comprising
   a first spacing bridge located on the first side of the first optical disc; and
   a second spacing bridge located on the first side of the second optical disc.

27. The multilayer optical disc of claim 18 further comprising:
   a first spacing bridge comprising a plurality of first segments located on the first side of the first optical disc; and
   a second spacing bridge comprising a plurality of second segments located on the first side of the second optical disc, the plurality of first segments being located between the plurality of second segments.

28. The multilayer optical disc of claim 18 wherein the spacing bridge comprises a plurality of randomly arranged protuberances.

29. A method of making a multilayer optical disc comprising:
   providing a first optical disc having a centerhole and a first side with a first data layer;

applying a bonding agent to the first side of the first optical disc during substantially a single rotation of the first optical disc;

providing a second optical disc having a centerhole and a first side with a second data layer;

placing the first side of the second optical disc on top of the first side of the first optical disc;

supporting the first side of the second optical disc on a first spacing bridge located between respective centerholes in the first and second optical discs and the first and second data layers and a second spacing bridge located between the first and second data layers and outer circumferential edges of the first and second optical discs; and spinning the first and second optical discs to spread the adhesive to a uniform, desired thickness therebetween.

30. The method of making a multilayer optical disc of claim 29 further comprising supporting the second optical disc on the spacing bridge extending between the first and second optical discs a distance substantially equal to the desired thickness of the adhesive.

31. The method of making a multilayer optical disc of claim 29 further comprising supporting the first side of the second optical disc on the first and second spacing bridges extending between the first and second optical discs a distance substantially equal to the desired thickness of the adhesive.

32. The method of making a multilayer optical disc of claim 29 further comprising supporting the first side of the second optical disc on the first and second spacing bridges extending between the first and second optical discs a distance of about 40–70 microns.

33. The method of making a multilayer optical disc of claim 29 further comprising supporting the first side of the second optical disc on the first and second spacing bridges extending between the first and second optical discs a distance of about 55 microns.

* * * * *